J. O. MORRIS.
TOBACCO MACHINE.
APPLICATION FILED OCT. 31, 1916. RENEWED FEB. 11, 1919.
1,316,054.
Patented Sept. 16, 1919.
7 SHEETS—SHEET 3.
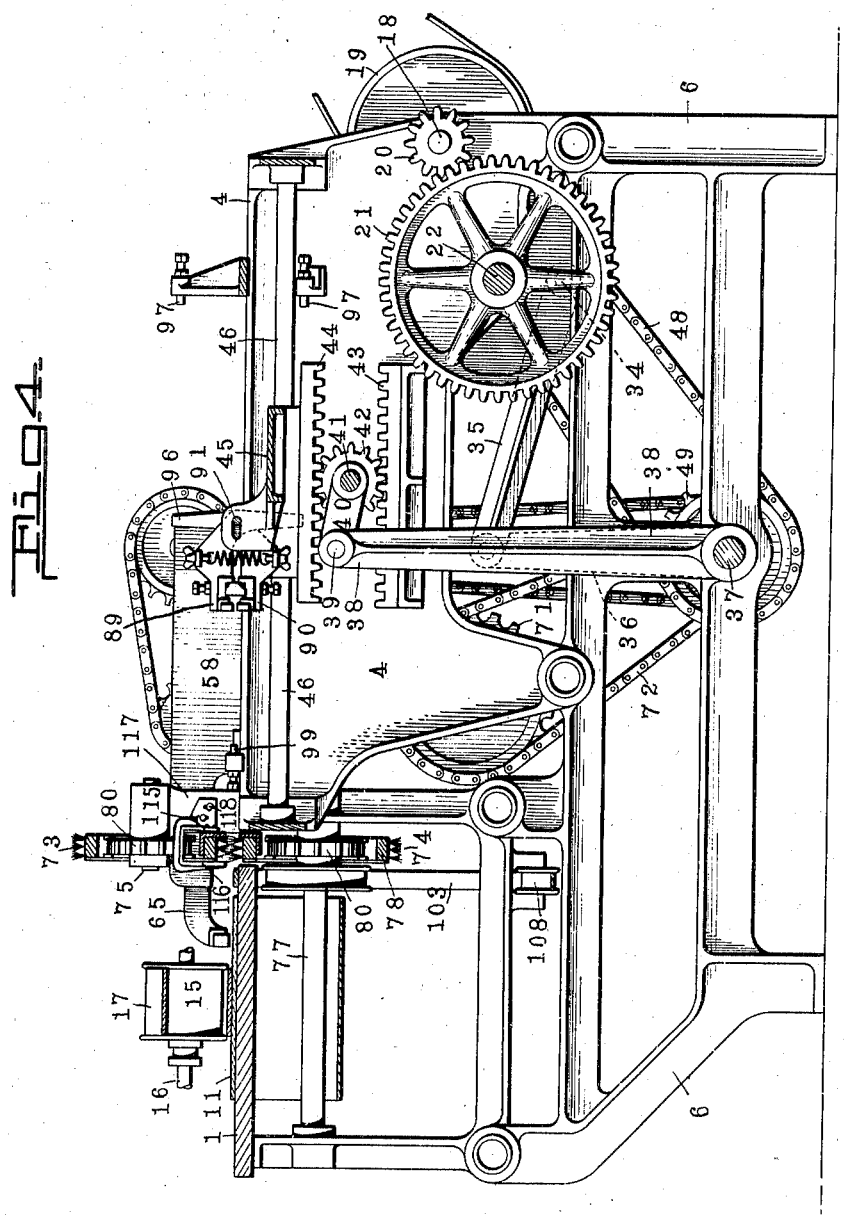
WITNESSES
INVENTOR
J. O. Morris
BY
Duell, Warfield & Duell
ATTORNEYS

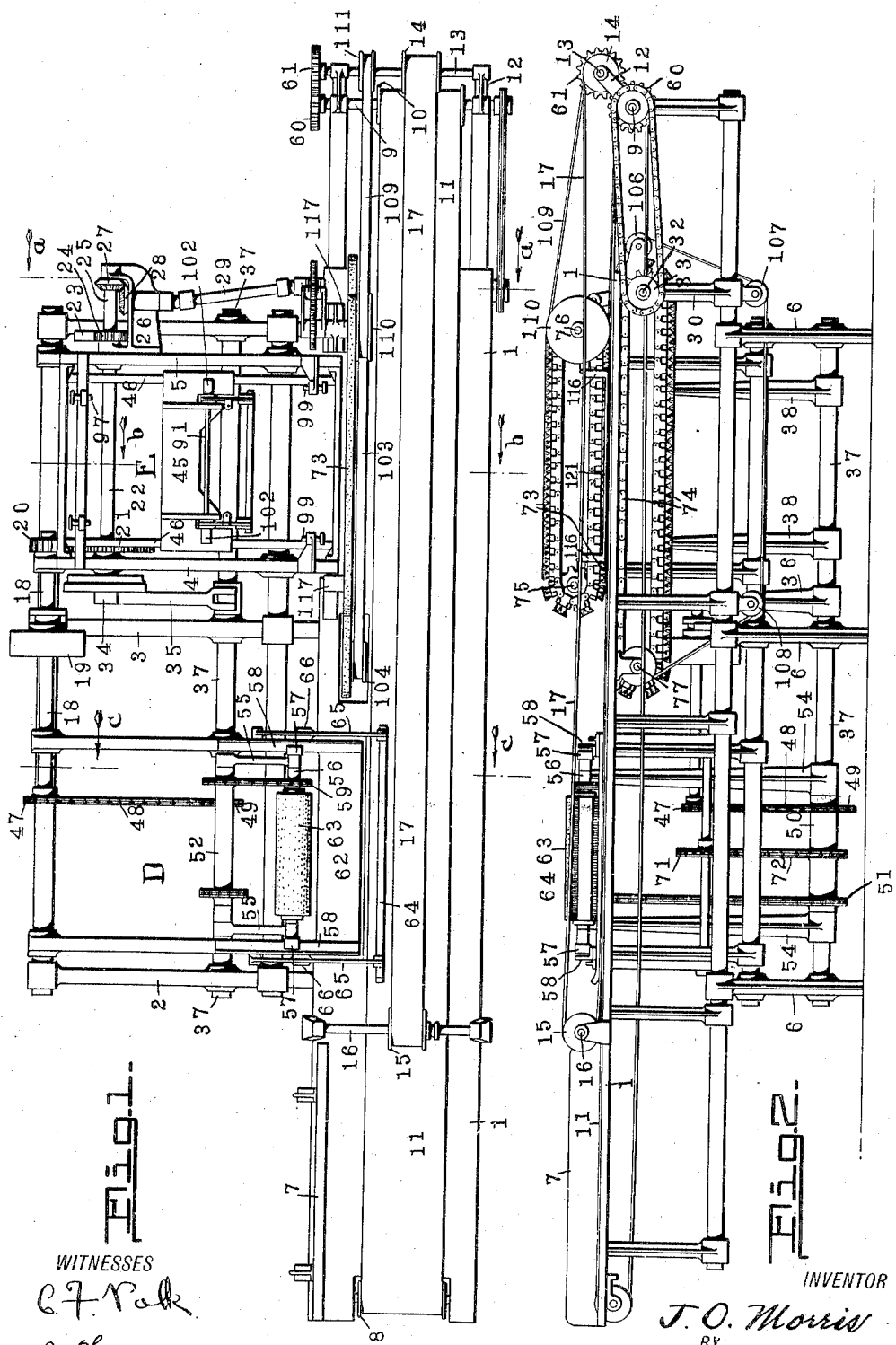
J. O. MORRIS.
TOBACCO MACHINE.
APPLICATION FILED OCT. 31, 1916. RENEWED FEB. 11, 1919.
1,316,054. Patented Sept. 16, 1919.
7 SHEETS—SHEET 1.

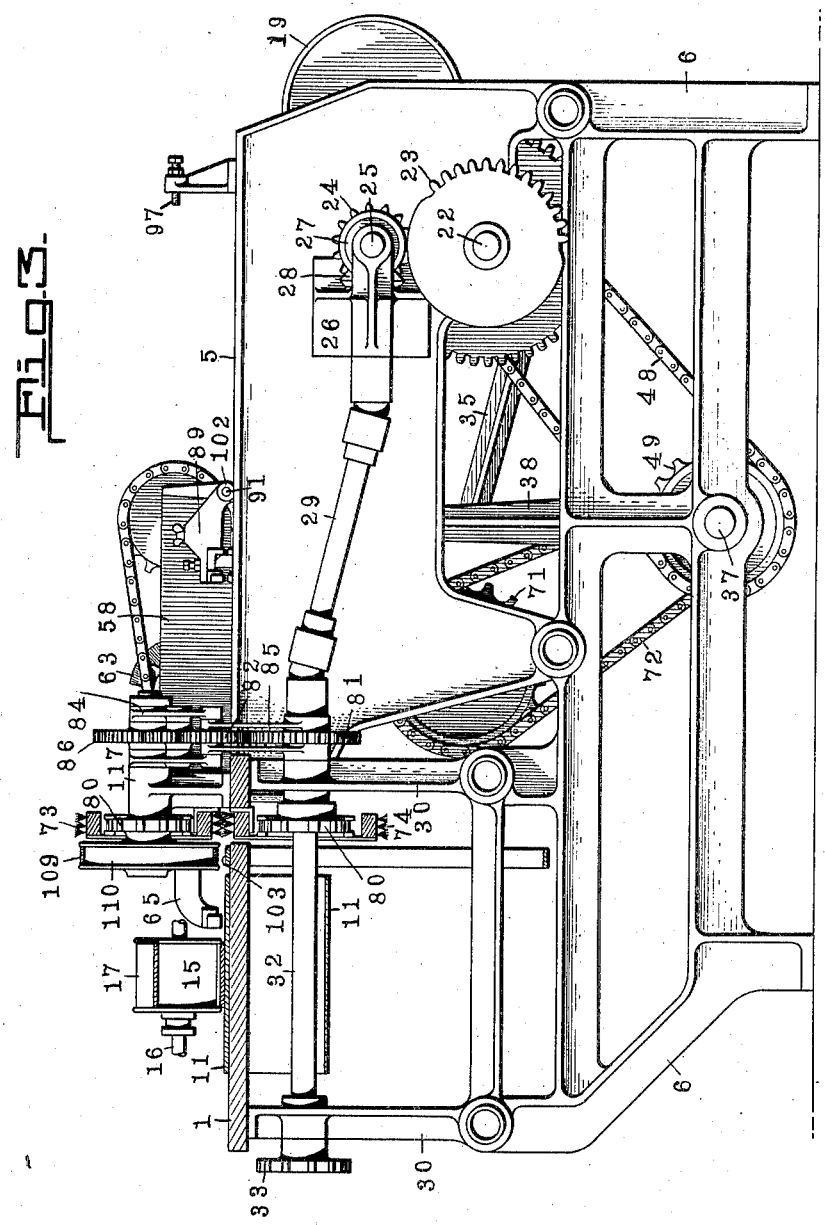

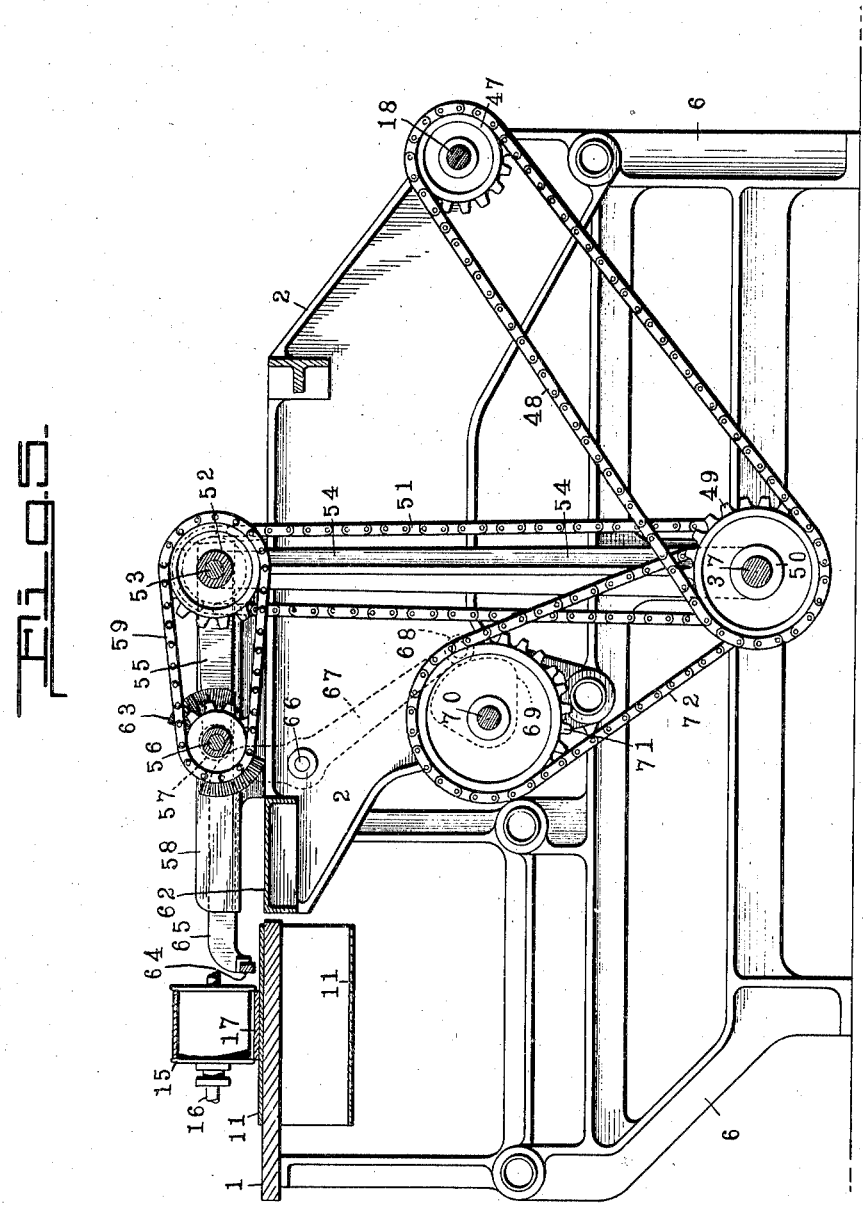

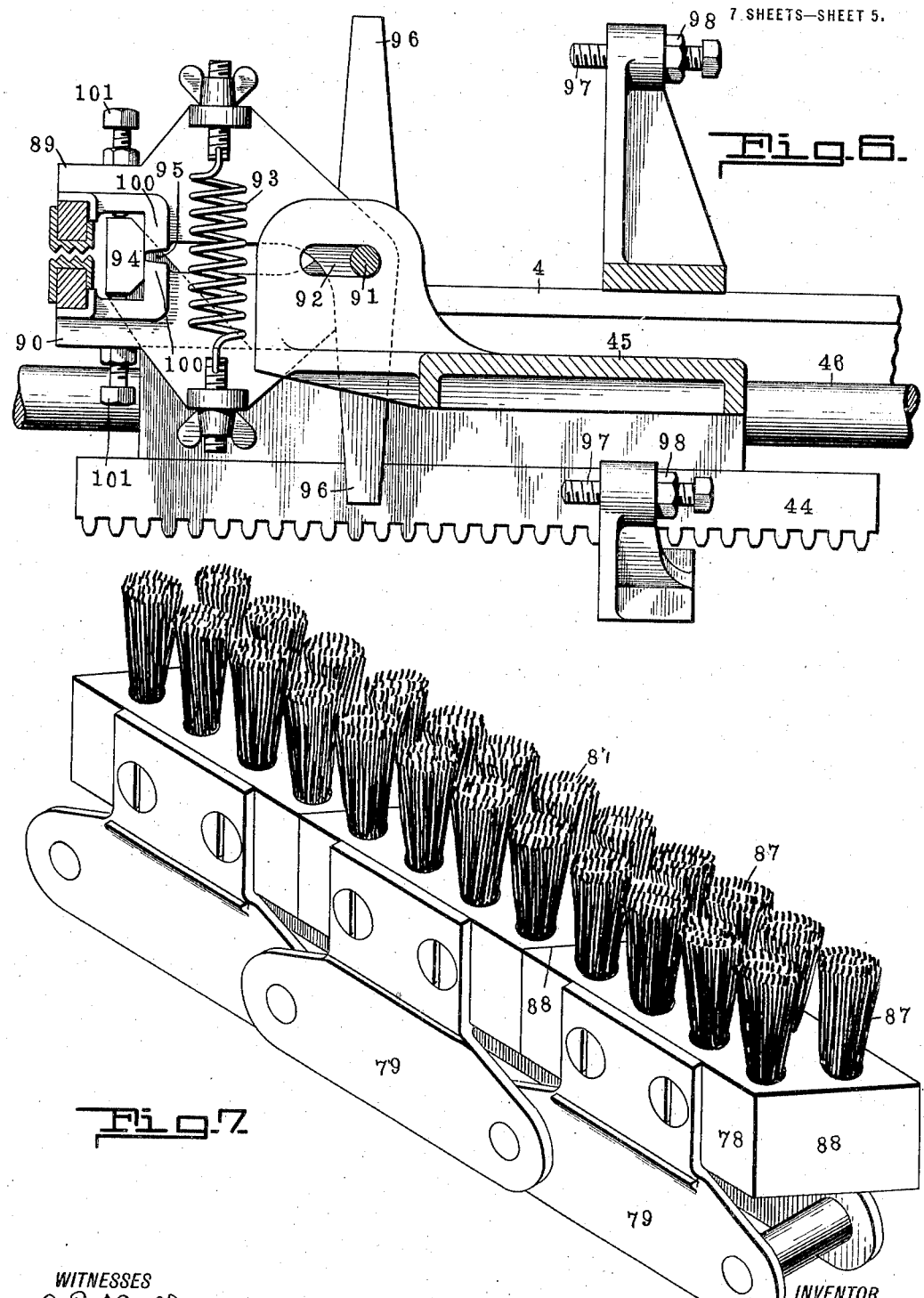

J. O. MORRIS.
TOBACCO MACHINE.
APPLICATION FILED OCT. 31, 1916. RENEWED FEB. 11, 1919.
1,316,054.
Patented Sept. 16, 1919.
7 SHEETS—SHEET 6.
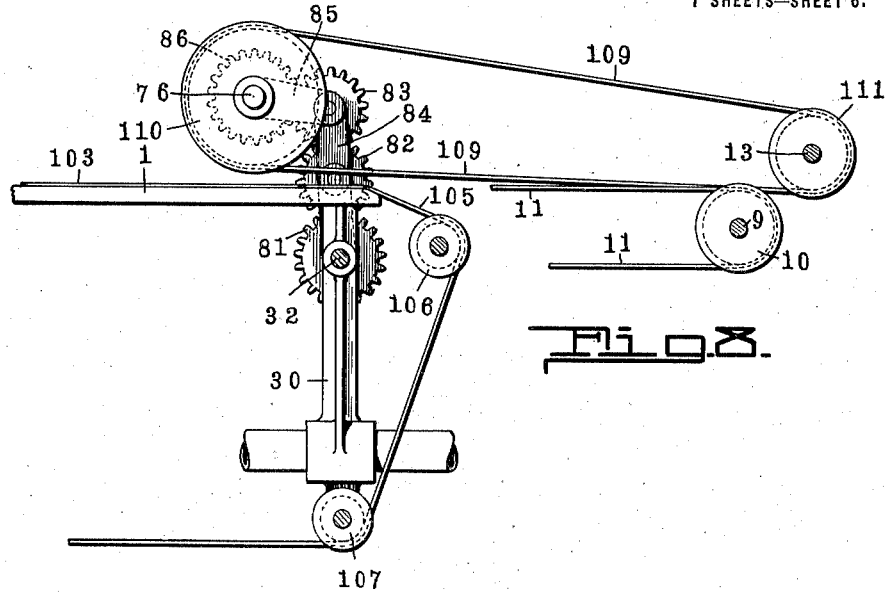
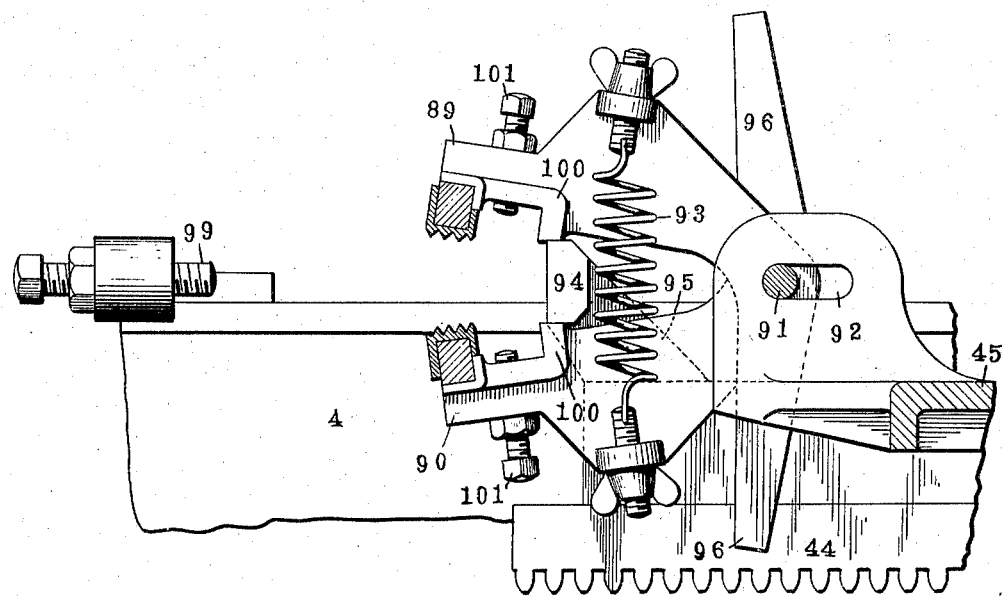

J. O. MORRIS.
TOBACCO MACHINE.
APPLICATION FILED OCT. 31, 1916. RENEWED FEB. 11, 1919.

1,316,054.

Patented Sept. 16, 1919.

UNITED STATES PATENT OFFICE.

JOHN O. MORRIS, OF WASHINGTON, DISTRICT OF COLUMBIA, ASSIGNOR TO ACME STRIPPING AND BOOKING MACHINE CO., OF NEW YORK, N. Y., A CORPORATION OF DELAWARE.

TOBACCO-MACHINE.

1,316,054.     Specification of Letters Patent.     Patented Sept. 16, 1919.

Application filed October 31, 1916, Serial No. 128,650. Renewed February 11, 1919. Serial No. 276,425.

*To all whom it may concern:*

Be it known that I, JOHN O. MORRIS, a citizen of the United States, residing at Washington, in the District of Columbia, have invented certain new and useful Improvements in Tobacco-Machines, of which the following is a full, clear, and exact description, such as will enable others skilled in the art to which it appertains to make and use the same.

This invention relates to tobacco machines, and with respect to its more specific features to machines of the character referred to adapted to automatically butt and stem leaves.

One of the objects of the invention is the provision of an efficient machine of simple construction adapted to automatically butt and stem leaves.

Another object of the invention is the provision of a practical butting device adapted to perform the butting operation rapidly without injuring the leaf.

Another object of the invention is the production of an efficient stemming mechanism of simple construction and positive in operation.

Another object of the invention is the production of a practical stripping device which will not injure the leaf and yet will efficiently coöperate to remove the greater portion of the leaf from the stem.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings forming part of this specification and wherein similar reference characters refer to similar parts throughout the several views,—

Figure 1 is a plan view of a machine embodying the invention;

Fig. 2 is a front elevation of Fig. 1;

Fig. 3 is a sectional view on the line *a—a* of Fig. 1;

Fig. 4 is a sectional view on the line *b—b* of Fig. 1;

Fig. 5 is a sectional view on the line *c—c* of Fig. 1;

Fig. 6 is a detail view showing the stem gripper mechanism in side elevation, partly in section;

Fig. 7 is a perspective view of a portion of a stripping belt;

Fig. 8 is a detail view showing the relative arrangement of certain of the belts employed in the machine;

Fig. 9 is a view similar to Fig. 6 but showing the gripper in open position.

Figure 11:
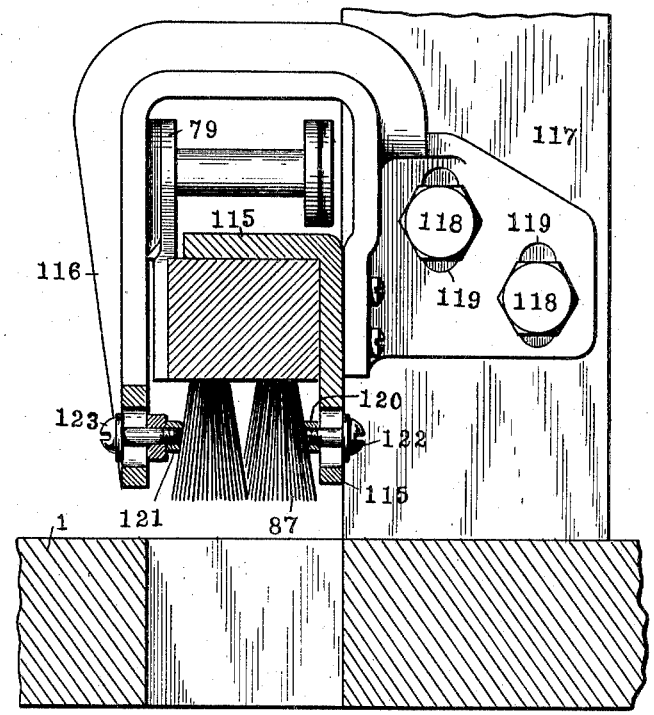
Figs. 10 and 11 show details of construction, Fig. 11 being a section on line *d—d*, Fig. 10.
Figure 10:
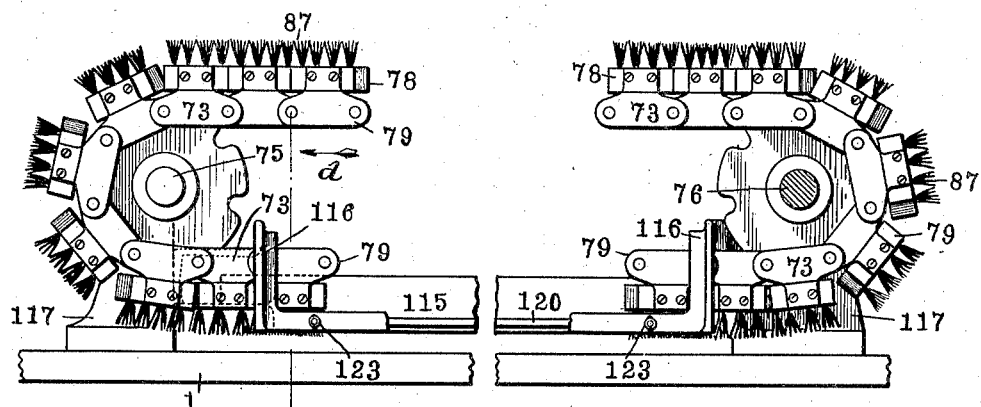

Referring now more specifically to the drawings, it will conduce to the clearness of the disclosure to first refer to the frame and the driving elements of the machine as associated therewith. As will be seen, the frame is composed of a front leaf-supporting table 1 from which extend transverse frame members 2, 3, 4 and 5, both the table and the frame members being supported on legs 6. Lengthwise of the table 1, and laterally of the machine, are disposed the butting mechanism and the stemming mechanism alongside of one another, the position of the butting mechanism being indicated generally by D, and the position of the stemming mechanism being indicated generally by E. The table 1 extends sufficiently to the left of the butting mechanism to provide unobstructed space for the introduction upon the table of the leaf to be treated. 7 indicates a gage board against which the butt ends of the leaves may be alined. At the left hand end of the table 1 is a belt pulley 8 and on the main frame at the right of the stemming mechanism is a shaft 9 supporting another belt pulley 10, and a main feed belt 11 passes around the pulleys 8 and 10, the upper ply of this belt lying upon the table 1, and the lower ply lying beneath said table. On brackets 12 at the right hand end of the machine is journaled a shaft 13 to which is attached a pulley 14, and another pulley 15 is supported on a shaft 16 at the left of the machine. A keeper belt 17 passes around the pulleys 14 and 15, this belt being above the belt 11, and its lower ply being adapted to coöperate with the latter belt to move some of the material toward the right hand end of the machine. At the rear of the machine (Fig. 1) is located a main driving shaft 18 journaled in the frame and having a driving pulley 19, to which rotary motion may be communicated from any suitable source of power. The main driving shaft has a main drive gear 20 meshing with a large pinion 21 on a counter shaft 22 journaled in the frame and extending longitudinally of the machine, the shaft 22 being continuously driven. Outside the right hand end of the main frame the counter shaft 22 carries a segment gear 23 which drives a pinion 24 on a stud shaft 25 journaled in a bracket 26 secured to the side of the main frame. Fixed to the shaft 25 is a bevel gear 27 driving a bevel gear 28 on a flexible shaft 29, one end of the shaft 29 being journaled in the bracket 26 and the other end being journaled in uprights 30 of the machine frame (Fig. 3), said latter end of the flexible shaft being continued across the machine beneath the table 1 and providing a cross shaft 32 having a sprocket wheel 33 at its end. By reason of the foregoing construction, it will be seen that the cross shaft 32 is intermittently driven from the main driving shaft.

On the counter shaft 22 is a crank pin 34 (Figs. 1 and 4), and a connecting rod 35 from said pin is pivotally connected to an upstanding arm 36 of a longitudinally extending rock shaft 37 journaled in lower cross pieces of the frame. Fixed to the rock shaft 37 are two upstanding rock arms 38, to each of which, at 39, is pivotally connected a link 40, in which latter is journaled a shaft 41 carrying pinions 42 meshing with the teeth 43 of a lower fixed or stationary rack, the pinions 42 also meshing with upper racks 44 on a reciprocatory carriage 45 slidable transversely of the machine on guide rods 46 supported in the upper portion of the main frame. By the construction just described, reciprocatory motion is communicated to the carriage 45 and the parts carried thereby, these parts being thus moved toward and from a certain stripping device to be hereinafter described.

On the left end of the main driving shaft 18 is a sprocket wheel 47 (Fig. 1) driving a sprocket chain 48 continuously. the chain 48 in turning driving, through the instrumentality of a sprocket wheel 49, a sleeve 50 journaled on the shaft 37, there being a sprocket and chain driving connection 51 between the sleeve 50 and a sleeve 52 supported on a shaft 53 carried by two upstanding rock arms 54, the lower ends of which are journaled on the shaft 37. On the shaft 53, outside the rock arms 54, are pivoted links 55 extending forwardly and connected by a shaft 56 having rollers 57 at its ends, said rollers sliding in guide-ways 58 provided on upwardly projecting portions of the machine frame. A rotatable butter brush is journaled on the shaft 56 between the arms 55, and is driven from the sleeve 52 through the instrumentality of a chain 59 coöperating with sprocket wheels on the shaft 56 and sleeve 52 respectively. By the construction just described, it will be seen that oscillatory forward and back motion is given the rock arms 54 so as to reciprocate the rotary butter brush, and it will also be seen that continuous rotary motion is communicated to said brush through the sprocket chain connections with the main driving shaft just referred to. Further, it is to be observed that a sprocket drive communicates motion from the cross shaft 32 to the shaft 9 and, by means of intermeshing gears 60 and 61, to the shaft 13. Inasmuch as the cross shaft 32 is intermittently rotated at predetermined times, the construction just described causes the main feed belt 11 and the keeper belt 17 to simultaneously intermittently move in a leaf-feeding direction past the front of the main parts of the butting and stemming devices, referred to as being located generally at D and E, respectively.

*Butting mechanism.*—The operator places the material to be operated upon, namely, the tobacco leaves, upon the belt 11 at the left hand end of the machine, pressing their butts against the gage board 7 to aline them. When the belts 11 and 17 make an advance movement, the leaf on belt 11 will eventually come between the coöperative plies of the belts 17 and 11, and the unstemmed leaf will be fed into alinement with the path of reciprocation of the rotary butting brush with its butt disposed over an auxiliary table 62 (Fig. 5). The keeper belt will coöperate with the main feed belt to assist in retaining the leaves in butting position, and when the continuously rotating butting brush 63 has advanced sufficiently it will wipe past the butt ends of the stems of the leaves and trim off the leaves from a portion of the length of the stems so as to provide butt portions free from leaf material and suitable for being effectively and readily gripped for the stemming operation subsequently to be performed. The rotatable butting member or brush may be of any suitable material, but fibrous material as tampico is preferred for the teeth, and in the present embodiment fields of tampico teeth are disposed around the rotatable member circumferentially in the direction of rotation, these fields or segments being spaced from each other in the direction of rotation of the brushes. This butting member rotates quite rapidly, and if the leaf is not butted by one field it will be by the other or by a subsequent operation of both fields. At a predetermined moment the butting brush recedes from the leaf so as to be out of the way for the subsequent movement of the butted leaf material toward the stemming mechanism. The guides 58 and rollers 57 provide for an easy movement of the rotary butter toward and from the material to be butted, and at the same time permit the rotary butter to rise slightly should any undue thickness of accumulation of leaf be encountered. In order to securely hold the material in position to be butted, an oscillatory member coöperates with the table 1 or the belt 11 thereon to press the material against the table during the butting operation. In the present embodiment this member comprises a longitudinally disposed bar 64 carried by a pair of rock arms 65 journaled in the frame at 66, each arm having a depending portion 67 terminating in an anti-friction roller 68 adapted to coöperate with a cam 69 on a shaft 70, rotary motion being communicated to the cam 69 by a sprocket 71 on the shaft 70 driven by a chain 72 from a sprocket on a sleeve 50 to which the sprocket 49 is fixed. Thus the cam 69 is continuously driven from the main driving shaft 18. The oscillatory member 64 will be rocked into position above the belt 11 in time to permit the leaves to be freely fed thereunder, and will then be rocked to hold the leaves in butting position during the butting operation.

*Stemming mechanism.*—The butting operation having been completed, the belts 11 and 17 make a feeding movement and feed the butted leaf toward the stemming mechanism while a new supply of unbutted material is simultaneously fed to the butting mechanism. The extent of intermittent movement of the belts 11 and 17 is preferably such as to first advance the butted leaf into position between the butting and the stemming mechanism, and then advance it into operative position in the stemming mechanism. As the leaf is fed to the stemming mechanism, the belts 11 and 17 conduct it between the coöperating plies of stripping belts 73 and 74, these belts being preferably endless, one being supported on shafts 75 and 76 above the table 1, and the other on a shaft 77 below said table and on the shaft 32. The teeth of the stripping belts are preferably of the tampico material, before referred to, and each belt preferably comprises longitudinal sections or base members 78 loosely articulated together, preferably each base member being fastened to pivotally connected links 79 of a sprocket chain or belt supported upon toothed wheels 80 on the respective shafts 75, 76, 77 and 32. The teeth of the lower ply of the upper belt and the teeth of the upper ply of the lower belt coöperate with each other and provide a stripping device comprising fields of teeth in front of the path of the stem drawing mechanism comprising a certain stem-gripping mechanism, which latter grips the butted stems of the leaves held by the stripping teeth and draws the stems rearwardly of the machine through the teeth in order to effect the stemming operation. The lower stripping belt is driven from the shaft 29 by means of three intermeshing pinions 81, 82 and 83 (see Fig. 8), the pinion 83 being journaled in the proximate ends of two pairs of links 84 and 85 journaled respectively on an intermediate portion of the shaft 29 and on the shaft 76, a fourth pinion 86 being fast to the shaft 76, meshing with the pinion 83 and operating to rotate one of the toothed wheels 80 to drive the upper belt, the lower belt being directly driven from the shaft 29. As the stripping belts pass over the respective supporting wheels 80, the links 79 pivot on each other and the fields or areas of teeth 87 of adjacent sections separate or come together, dependent upon whether they are moving into or out of alinement. When moving into alinement, there may be a space between the ends of adjacent fields at times, and as this might interfere with efficient stripping by permitting the leaf to be drawn through such a space with its stem, the ends of the sections are beveled transversely of the machine, as indicated at 88, so as to cause the brush portions of one member to overlap the brush portions of the adjacent member longitudinally of the machine even when the adjacent links are spaced apart.

In the present embodiment the mechanism by means of which the stems are pulled through the stripping device comprises a pair of coöperative stem gripping jaws 89 and 90 (Figs. 4, 6, and 9). These jaws are rectilinearly reciprocated in the plane of the stripping device, being open and moving forwardly into position, then being closed, and then being moved rearwardly so as to effect the stripping operation. Preferably the jaws are pivotally and translatably mounted on the carriage or gripper jaw carrier 45, previously referred to, each jaw being pivoted on a longitudinal shaft or axis 91 movable in a horizontal slot 92 of the carriage, a spring 93 being adjustably connected to the jaws and tending to close them. A member 94 is provided which, in one position, holds the jaws apart at predetermined times (Fig. 9), and in another position permits the jaws to close for a predetermined amount (Fig. 6), so that the member 94 may be termed a jaw gaging device. In the present embodiment this jaw gaging device, or jaw spacing member, is disposed between the jaws, is mounted on the carriage 45, and is movable toward and from the pivotal axis 91 of the jaws. It is supported on the carriage by means of an arm 95. Each jaw is provided with a pair of arms 96, one pair extending upwardly and the other downwardly and adapted to coöperate with adjustable fixed abutments 97, these latter being provided by set screws mounted on brackets on the rear of the main frame and provided with lock nuts 98. Another pair of adjustable but otherwise fixed abutments is provided in position to coöperate with the jaws adjacent the end of the advance movement of the grippers, these latter being indicated at 99 and serving to arrest the forward movement of the gripper jaws while permitting a further advance movement of the carriage 45. In operation, when the jaws 89 and 90 have closed upon the stems of the leaves, the carriage 45 moves back in rectilinear path and the jaws draw the stems rearwardly through the stripping device. During the greater part of this movement the jaw gaging or holding device 94 is in the position illustrated in Fig. 6, being between the jaws, with the inwardly projecting dogs 100 of each in rear of the abutment 94, so that upon such portion of the rearward movement there will be no relative translatory movement between the jaws and the carriage. At the completion of the rearward movement of the jaws the arms 96 thereon will contact with the abutments or stops 97 to open the jaws. The opening of the jaws will cause the dogs 100 to separate and permit the device 94 to be drawn between said dogs by the further rearward movement of the carriage 45. The member 94 will thus hold the jaws apart, as the dogs 100 will rest upon the upper and lower flat faces of this member. The position of the parts at this time is illustrated in Fig. 9. When the carriage advances for the next gripping operation, the laterally extending hubs 102 of the axis 91 will contact with the abutments or stops 99 and limit further advance translatory movement of the jaws. But the carriage 45 will continue to advance sufficiently to carry the member 94 out of its previous position, as seen in Fig. 9, into the position illustrated in Fig. 6, thus permitting the spring 93 to close the jaws 89 and 90 so as to grip the stems of the leaves. The next succeeding rearward movement of the carriage operates to draw the leaves through the stripping device as before described.

Any leaf which has not been stemmed will remain between the belts 11 and 17 and be carried to the right hand end of the machine and discharged from this end of the belt 11. The stemmed leaf will be crumpled up and will lie partly on the stemmed leaf carrier belt 103 (Fig. 1). The belt 103 lies in front of the stripping belts adjacent their coöperative plies and between the stripping device and the belt 11. It passes around a pulley 104 on the shaft 77, over the upper surface of the table 1, and at the right hand end of the table surface it inclines downwardly, as at 105 (Fig. 8) passing around guide pulleys 106, 107 and 108, these latter pulleys being supported on the frame. This belt is intermittently driven by the pulley 104, which is attached to the shaft 77.

A stemmed leaf clearer belt 109 has one end overlapping a portion of the stemmed leaf carrier belt 103, and the stemmed leaf is eventually received between these two belts and discharged from the machine. The clearer belt 109 is supported on pulleys 110 and 111, the latter pulley being fast on the shaft 13 so as to be intermittently driven. The belt 109 being driven from the pulley 111, its lower ply tends to pull the leaf from the belt 105, instead of pushing it therefrom, as would be the case were belt 109 driven from the pulley 110. Pulling the leaf from belt 105 is found to be much more efficient than pushing it therefrom.

To provide for adjusting the coöperative brushes of the stripping belts relative to each other, and to provide for varying the effective flexibility of the brushes of these belts, the lower ply of the upper belt is guided beneath an angle-iron way 115, supported by brackets 116, each of these brackets being adjustably fastened to an upstanding frame member 117, by set screws 118 passing through slots 119, in the bracket. One of these brackets is shown in Fig. 11. By this construction the lower ply of the upper stripping belt may be adjusted toward and from the coöperative ply of the lower stripping belt. The lower portions of the brackets 116, and the angle-iron 115, extend opposite the teeth 87 of the brushes, and on these lower portions are fastened abutments 120, 121, with which the sides of the brush teeth are adapted to contact as they pass along the guideway formed by the angle-iron 115. The abutments consist of narrow strips disposed longitudinally of the path of the teeth 87, and adjustable longitudinally of these teeth, as by means of set screws 122, 123, passing through vertically elongated slots in the parts 115 and 116, and engaging said strips. Should the full length of the teeth 87 provide too much flexibility, the strips 120 and 121 may be adjusted to position against a proper intermediate side portion of the length of the teeth, so that the teeth are in effect shortened, thus making them stiffer, and vice-versa. By this construction the brushes may also be crowded together laterally so as to vary their effective flexibility. Either of the belts 73 and 74 may be regarded as a presser belt to press the leaf toward the other.

It is of course to be understood that the various parts and mechanisms hereinbefore described are arranged and proportioned so as to synchronize in timed relation in the operation of the machine. Preferably all the belts of the machine are simultaneously intermittently driven in accordance with the foregoing description.

Thus by the above described construction are accomplished, among others, the objects hereinbefore mentioned, and feeding, butting, stemming and discharging effected simultaneously in a rapid and effective manner.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In an apparatus of the character described, in combination, a stemming mechanism comprising an intermittently movable stripping belt and stem gripper mechanism adapted to reciprocate toward and from the stripping belt, a stem butting mechanism operating synchronously with said stemming mechanism, and means adapted to automatically transfer the butted material to the stemming mechanism.

2. In an apparatus of the character described, in combination, a stemming mechanism comprising a stripping device and stem gripper mechanism adapted to reciprocate toward and from the stripping device, a stem butting mechanism operating synchronously with said stemming mechanism comprising a rotatable butting member mounted to reciprocate toward and from the material to be butted, means to hold the material in butting position, and means adapted to automatically transfer the butted material to the stemming mechanism.

3. In an apparatus of the character described, in combination, a stemming mechanism comprising a stripping device and stem gripper mechanism adapted to reciprocate toward and from the stripping device, a stem butting mechanism operated synchronously with said stemming mechanism comprising a rotatable butting member mounted to reciprocate toward and from the material to be butted, an oscillating member adapted to hold the material which is being butted, and means adapted to automatically transfer the butted material to the stemming mechanism.

4. In an apparatus of the character described, in combination, a stemming mechanism comprising a stripping device and stem gripper mechanism adapted to reciprocate toward and from the stripping device, a stem butting mechanism operating synchronously with said stemming mechanism comprising a rotatable butting member mounted to reciprocate toward and from the material to be butted, means to hold the material in butting position, and means adapted to automatically transfer the butted material to the stemming mechanism, said stripping device comprising intermittently movable coöperative stripping belts between which the material lies while being stemmed.

5. In an apparatus of the character described, in combination, a stemming mechanism comprising a stripping device and stem gripper mechanism adapted to reciprocate toward and from the stripping device, a stem butting mechanism operating synchronously with said stemming mechanism comprising a rotatable butting member mounted to reciprocate toward and from the material to be butted, means to hold the material in butting position, means adapted to automatically transfer the butted material to the stemming mechanism, said stripping device comprising intermittently movable coöperative stripping belts between which the material lies while being stemmed, a stemmed leaf carrier laterally movable in front of said stripping device, and a clearer adapted to operate on the stemmed leaf adjacent the outer end of the carrier.

6. In an apparatus of the character described, in combination, a stemming mechanism comprising a stripping device and stem gripper mechanism adapted to reciprocate toward and from the stripping device, a stem butting mechanism operating synchronously with said stemming mechanism comprising a rotatable butting member mounted to reciprocate toward and from the material to be butted, means to hold the material in butting position, means adapted to automatically transfer the butted material to the stemming mechanism, said stripping device comprising intermittently movable coöperative stripping belts between which the material lies while being stemmed, a stemmed leaf carrier belt laterally movable in front of said stripping device, and a clearer belt adapted to operate on the stemmed leaf on the carrier adjacent the outer end of the latter, said carrier belt inclining away from said clearer belt at its outer end.

7. In an apparatus of the character described, in combination, a stemming mechanism comprising a stripping device and stem gripper mechanism adapted to reciprocate toward and from the stripping device, a stem butting mechanism operating synchronously with said stemming mechanism comprising a rotatable butting member mounted to reciprocate toward and from the material to be butted, means to hold the material in butting position, means adapted to automatically transfer the butted material to the stemming mechanism, said stripping device comprising intermittently movable coöperative stripping belts between which the material lies while being stemmed, a stemmed leaf carrier laterally movable in front of said stripping device, a clearer adapted to operate on the stemmed leaf on the carrier adjacent the outer end of the latter, a main feed belt intermittently movable in front of said stemming mechanism and said butting mechanism, and a keeper belt intermittently movable above said main feed belt and coöperating with the latter to retain unstemmed material thereon.

8. In an apparatus of the character described, in combination, an intermittently movable stripping belt, a stem gripper mounted to reciprocate in a rectilinear path toward and from said stripping belt, and means adapted to cause said gripper to close on the stems at one point in its reciprocatory path nearer the stripping belt and release the stems at another point therein farther from the stripping belt.

9. In an apparatus of the character described, in combination, a rectilinearly reciprocatory carriage, coöperative stem gripper jaws carried thereby, a stripping device comprising mutually coöperative intermittently movable belts toward and from which said jaws are moved by said carriage on the side opposite that from which the material to be stripped approaches, and stationary abutments adapted to coöperate with said gripper jaws to open them at a predetermined point in the path of reciprocation of said carriage.

10. In an apparatus of the character described, in combination, a gripper jaw carrier, a pair of stem gripper jaws pivotally and translatably mounted on said carrier, a spring tending to close said jaws, means adapted to reciprocate said carrier, a member adapted to hold said jaws from closing under the influence of said spring, and means whereby the movement of the carrier causes translatory movement between said jaws and carrier and moves said member so as to permit the jaws to close.

11. In an apparatus of the character described, in combination, a gripper jaw carrier, a pair of stem gripper jaws pivotally and translatably mounted on said carrier, a spring tending to close said jaws, means adapted to reciprocate said carrier, a jaw spacing member, and means whereby the movement of said carrier causes said jaws to open and a translatory movement between said member and said jaws to dispose said member in position to hold said jaws open.

12. In an apparatus of the character described, in combination, a gripper jaw carrier, a pair of stem gripper jaws, a jaw gaging device, and means whereby the reciprocation of said carrier causes said jaws to open at a predetermined point in the path of movement of the carrier and be held open by said gaging device and to close at another point for an amount determined by said gaging device.

13. In an apparatus of the character described, in combination, a gripper jaw carrier having a jaw gaging device, a pair of stem gripper jaws pivotally mounted on said carrier and translatable relative thereto, said gaging device being between said jaws, a spring tending to close said jaws, means adapted to reciprocate said carrier, means adapted to coöperate with said jaws at a predetermined point in the path of the carrier to cause relative movement between said gaging device and said jaws so as to permit said jaws to close, and means adapted to coöperate with said jaws at another point to open said jaws and cause relative movement between said jaws and carrier, thereby disposing said gaging device at a different point between said jaws.

14. In an apparatus of the character described, in combination, a gripper jaw carrier having a jaw gaging device, a pair of stem gripper jaws pivotally mounted on said carrier and translatable relative thereto, said gaging device being between said jaws, a spring tending to close said jaws, means adapted to reciprocate said carrier, and means adapted to coöperate with said jaws at a predetermined point in the path of the carrier to cause movement of said gaging device away from the pivotal axis of said jaws and at a different point to cause movement of said gaging device toward said axis.

15. In an apparatus of the character described, in combination, a reciprocatory gripper jaw carrier having a slot and a jaw holding member, a pair of gripper jaws pivotally mounted on an axis movable in said slot, said jaws having arms on one side of said axis, and said holding member being between said jaws on the opposite side of said axis, a spring tending to urge said jaws together, and stops at the opposite ends of the path of reciprocation of said carrier, those at one end being adapted to contact with said axis and those at the other end with said arms.

16. In an apparatus of the character described, in combination, a reciprocatory gripper jaw carrier having a slot and a jaw holding member, a pair of gripper jaws pivotally mounted on an axis movable in said slot, said jaws having arms on one side of said axis, and said holding member being between said jaws on the opposite side of said axis, a spring tending to urge said jaws together, and stops at the opposite ends of the path of reciprocation of said carrier, those at one end being adapted to contact with said axis and those at the other end with said arms, and means adapted to adjust the effective position of said stops.

17. In an apparatus of the character described, in combination, a gripper jaw carrier, a pair of stem gripper jaws, a jaw gaging device, means whereby the reciprocation of said carrier causes said jaws to open at a predetermined point in the path of movement of the carrier and be held open by said gaging device and to close at another point for an amount determined by said gaging device, and means adapted to reciprocate said carrier, comprising a rack on said carrier, a fixed rack, a rock arm, and a pinion rotatably connected to said rock arm and engaging said racks.

18. In an apparatus of the character described, in combination, a stripping device comprising a belt composed of loosely articulated longitudinal sections, said sections having stripping teeth, the teeth of one section overlapping the teeth of an adjacent section.

19. In an apparatus of the character described, in combination, a pair of stripping belts, means adapted to move said belts, said belts comprising longitudinal sections pivotally connected, and stripping teeth on said sections, teeth on one section overlapping teeth on an adjacent section of the same belt, the teeth on one belt being disposed to coöperate with the teeth on the other belt in the stripping operation.

20. In an apparatus of the character described, in combination, a pair of stripping belts, means adapted to move said belts, said belts comprising longitudinal sections pivotally connected, and stripping teeth on said sections, the teeth on one belt being disposed to coöperate with the teeth on the other belt in the stripping operation, and composed of tampico material.

21. In an apparatus of the character described, in combination, a belt having flexible stripping teeth projecting therefrom, means adapted to vary the effective flexibility of said teeth and means for drawing the stems past said teeth to remove the leaf from the stems.

22. In an apparatus of the character described, in combination, a belt having flexible stripping teeth projecting therefrom, means movable toward and from said belt adapted to contact said teeth to vary the effective flexibility of said teeth and means for drawing the stems past said teeth to remove the leaf from the stems.

23. In an apparatus of the character described, in combination, a brush comprising a belt with projecting flexible stripping teeth, a guideway in which said belt is adapted to move, an abutment with which the sides of the flexible teeth are adapted to contact in the passage through said guideway, and means adapted to adjust said abutment longitudinally of said teeth.

24. In an apparatus of the character described, in combination, a pair of endless belts, each comprising flexible teeth, the teeth of one being adapted to coöperate with those of the other to effect stripping, means adapted to adjust one of said belts toward and from the other at their coöperative portions, and means adapted to vary the effective flexibility of the teeth of one of said belts.

25. In an apparatus of the character described, in combination, a pair of endless belts, each comprising flexible teeth, the teeth of one being adapted to coöperate with those of the other to effect stripping, means adapted to adjust one of said belts toward and from the other at their coöperative portions, and means adapted to vary the effective flexibility of the teeth of one of said belts, comprising an abutment adapted to contact a side of said teeth, and adjustable longitudinally of said teeth.

26. In an apparatus of the character described, in combination, a stripping device comprising stripping belts, the teeth of one of which are adapted to coöperate with those of the other in stripping, a stem gripper mounted to reciprocate toward and from the coöperating portions of said belts, and means adapted to cause said gripper to close on the stems when adjacent thereto and to thereafter release said stems.

27. In an apparatus of the character described, in combination, a stripping device comprising stripping belts having tampico teeth, the teeth of one of which are adapted to coöperate with those of the other in stripping, a stem gripper mounted to reciprocate toward and from the coöperating portions of said belts, and means adapted to cause said gripper to close on the stems when adjacent thereto, and to thereafter release said stems.

28. In an apparatus of the character described, in combination, a stripping device, a stem gripper mounted to reciprocate toward and from said stripping device, means adapted to cause said gripper to close on the stems at one point in its reciprocatory path and release the stems at another point therein, and means adapted to carry the stemmed leaf from the path of succeeding unstemmed leaves fed to the stripping device comprising a laterally intermittently movable stemmed leaf carrier belt in front of the coöperative position of said stripping device, and a belt overlapping said stemmed leaf carrier belt and coöperating therewith to remove the stemmed leaf from said carrier belt.

29. In an apparatus of the character described, in combination, a stripping device comprising stripping belts, the teeth of one of which are adapted to coöperate with those of the other in stripping, a stem gripper mounted to reciprocate toward and from the coöperating positions of said belts, means adapted to cause said gripper to close on the stems when adjacent thereto, and to thereafter release said stems, a main feed belt adapted to conduct the unstemmed leaf between the coöperative plies of said stripping belts, and means adapted to simultaneously intermittently move said main feed belt and said stripping belts in a leaf feeding direction.

30. In an apparatus of the character described, in combination, a stripping device comprising stripping belts, the teeth of one of which are adapted to coöperate with those of the other in stripping, a stem gripper mounted to reciprocate toward and from the coöperating positions of said belts, means adapted to cause said gripper to close on the stems when adjacent thereto, and to thereafter release said stems, a main feed belt adapted to conduct the unstemmed leaf between the coöperative plies of said stripping belts, means adapted to simultaneously intermittently move said main feed belt and said stripping belts in a leaf feeding direction, a keeper belt transversely covering a portion of the unstemmed leaf on the main feed belt, and means adapted to move the latter belt with the main feed belt.

31. In an apparatus of the character described, in combination, a stripping device comprising stripping belts, the teeth of one of which are adapted to coöperate with those of the other in stripping, a stem gripper mounted to reciprocate toward and from the coöperating positions of said belts, means adapted to cause said gripper to close on the stems when adjacent thereto, and to thereafter release said stems, a main feed belt adapted to conduct the unstemmed leaf between the coöperative plies of said stripping belts, means adapted to simultaneously intermittently move said main feed belt and said stripping belts in a leaf feeding direction, a keeper belt transversely covering a portion of the unstemmed leaf on the main feed belt, means adapted to move the latter belt with the main feed belt, and an intermittently movable stemmed leaf carrier belt between the main feed belt and said stripping belts.

32. In an apparatus of the character described, in combination, a stripping device comprising stripping belts, the teeth of one of which are adapted to coöperate with those of the other in stripping, a stem gripper mounted to reciprocate toward and from the coöperating positions of said belts, means adapted to cause said gripper to close on the stems when adjacent thereto, and to thereafter release said stems, a main feed belt adapted to conduct the unstemmed leaf between the coöperative plies of said stripping belts, means adapted to simultaneously intermittently move said main feed belt and said stripping belts in a leaf feeding direction, a keeper belt transversely covering a portion of the unstemmed leaf on the main feed belt, means adapted to move the latter belt with the main feed belt, an intermittently movable stemmed leaf carrier belt between the main feed belt and said stripping belts, and a clearer belt overlapping said stemmed leaf carrier belt at one end.

33. In an apparatus of the character described, in combination, a rotatable butting brush, and means adapted to reciprocate said brush transversely of the axis of rotation into and out of butting position.

34. In an apparatus of the character described, in combination, a rotatable butting brush, means adapted to reciprocate said brush transversely of the axis of rotation into and out of butting position, and means comprising an oscillatory member adapted to hold the leaf for being operated upon by said brush.

35. In an apparatus of the character described, in combination, a rotatable butting brush, means adapted to reciprocate said brush transversely of the axis of rotation into and out of butting position, means comprising an oscillatory member adapted to hold the leaf for being operated upon by said brush, and an intermittently movable belt adapted to feed a leaf into position to be operated upon by said brush.

36. In an apparatus of the character described, in combination, a rotatable butting brush, means adapted to reciprocate said brush transversely of the axis of rotation into and out of butting position, means comprising an oscillatory member adapted to hold the leaf for being operated upon by said brush, and an intermittently movable belt adapted to feed a leaf into position to be operated upon by said brush, said rotatable butting brush comprising teeth fields spaced from each other in the direction of rotation of the brush.

37. In an apparatus of the character described, in combination, a stripping device comprising a series of base members having stripping teeth, means adapted to move the series into and out of stripping position, connections between said members whereby teeth on one base member move longitudinally relative to teeth on an adjacent base member at points in the paths of movement of said series, teeth on one base member being disposed to overlap with those of an adjacent base member to maintain the continuity of the teeth when the base members are spaced by said relative movement.

38. In a machine of the character described, in combination, a movable field of stripping teeth, and means coöperative to press the leaf into engagement with said teeth, said last mentioned means comprising a movable belt of loosely articulated relatively longitudinally disposed sections having areas of teeth adapted to coöperate with the leaves.

39. In a machine of the character described, in combination, a movable field of stripping teeth, and means coöperative to press the leaf into engagement with said teeth, said last mentioned means comprising a movable belt of loosely articulated relatively longitudinally disposed sections having areas of teeth adapted to coöperate with the leaves, the area of one section longitudinally overlapping that of an adjacent section.

40. A tobacco stripping mechanism comprising, in combination, a movable endless belt having a longitudinally disposed field of stripping teeth, and a movable endless belt of loosely articulated relatively longitudinally disposed sections having areas of teeth adapted to press the leaves into engagement with the teeth of said field.

41. A tobacco stripping mechanism comprising, in combination, a movable endless belt having a longitudinally disposed field of stripping teeth, and a movable endless belt of loosely articulated relatively longitudinally disposed sections having areas of teeth adapted to press the leaves into engagement with the teeth of said field, said belts being disposed opposite one another, and means adapted to firmly support the plies of said belts where they coöperate in the stripping operation.

In testimony whereof I affix my signature, in the presence of two witnesses.

JOHN O. MORRIS.

Witnesses:
J. W. ANDERSON,
C. J. KULBERG.